Patented Nov. 17, 1925.

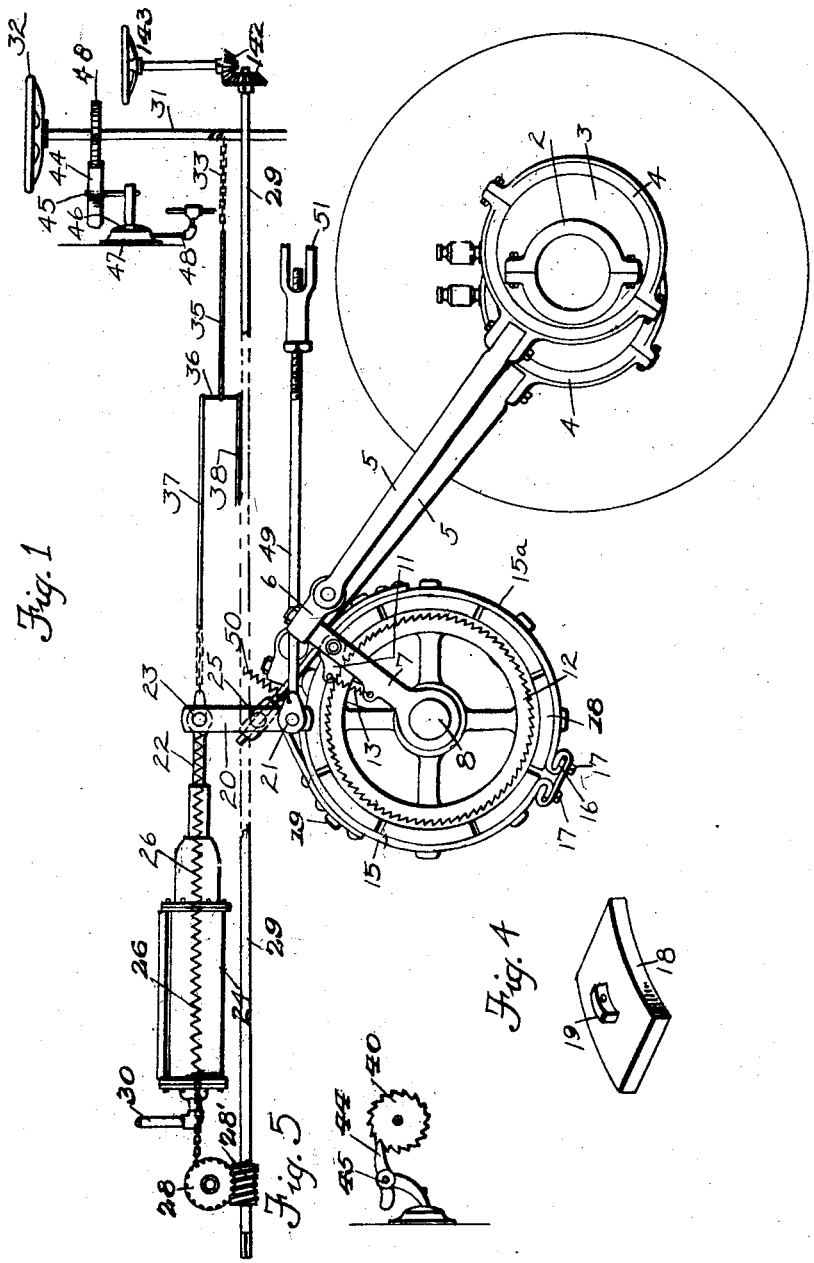

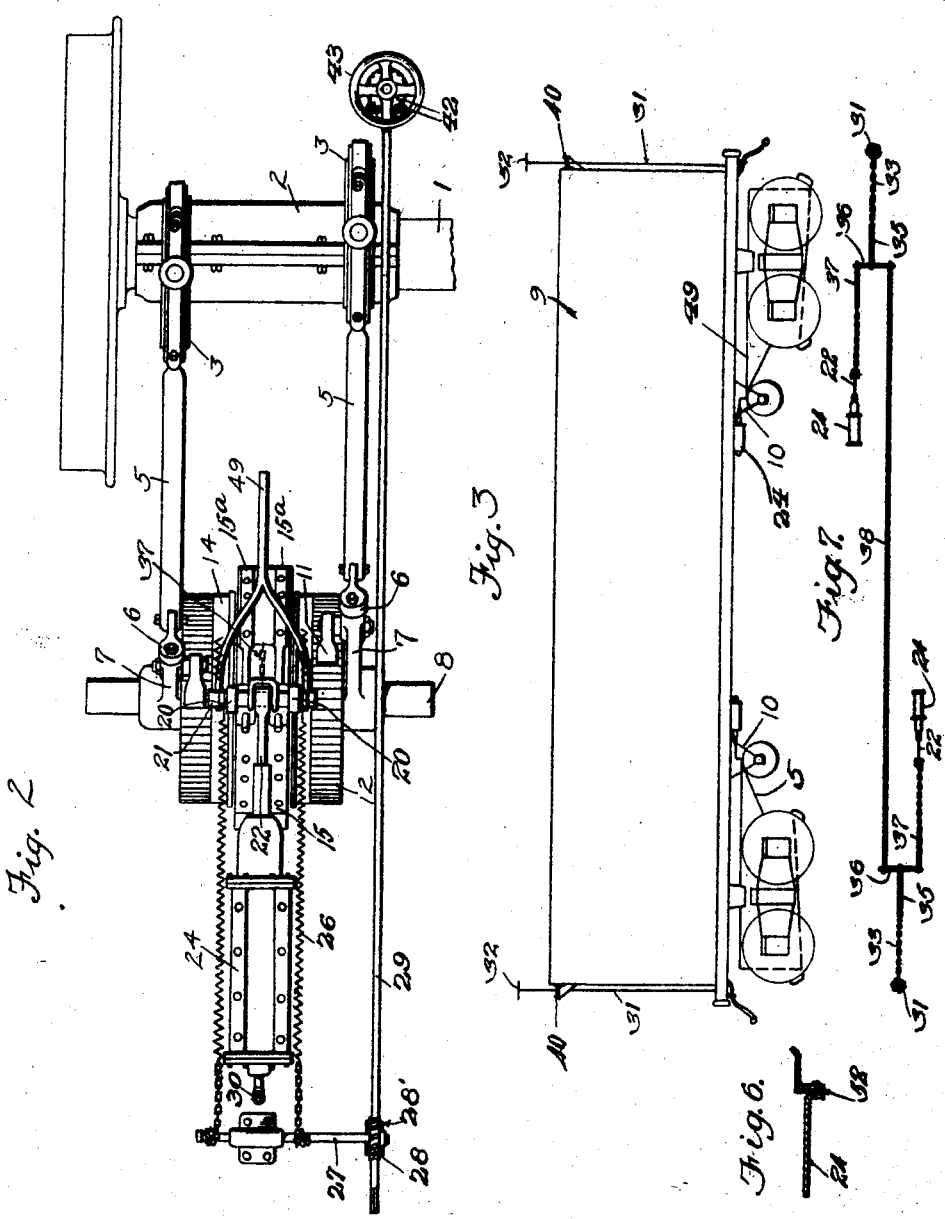

1,561,794

UNITED STATES PATENT OFFICE.

PETER L. PETERSON, OF MANTI, UTAH.

BRAKE.

Application filed December 29, 1922. Serial No. 609,691.

*To all whom it may concern:*

Be it known that I, PETER L. PETERSON, a citizen of the United States, and a resident of Manti, in the county of Sanpete and State of Utah, have invented certain new and useful Improvements in Brakes, of which the following is a specification.

My invention is an improvement in brakes, and has for its object to provide a brake especially adapted for use with railway cars and controlled by movement of the car to braking position, the controlling means being operative at all times while the car is in motion and being restrained from applying the brake by air pressure in the train line, and capable of being released by raising the pressure in the train line or by the hand wheel from the top of the car.

In the drawings:

Figure 1 is a side view of the braking mechanism detached;

Figure 2 is a top plan view;

Figure 3 is a diagrammatic view showing the mechanism mounted on the car;

Figure 4 is a perspective view of one of the brake shoes;

Figure 5 is a top plan view showing the pawls for the hand wheel;

Figure 6 is a fragmentary view in section showing the gasket employed at one end of the brake cylinder, and Figure 7 is a diagrammatic view, partly in elevation and partly in section, showing how the braking mechanisms at the opposite ends of the car are associated.

In the present embodiment of the invention one axle 1 of each car or of each truck has clamped thereon a sleeve or drum 2 which carries at its ends oppositely arranged eccentrics 3, the eccentrics and the drum rotating with the axle.

A strap 4 encircles each eccentric, and each strap has connected therewith a link 5 connected at the end remote from the axle by a universal joint connection 6, with the outer end of a pawl carrying lever 7. Of course ball bearings may be arranged between the parts 3 and 4 so that frequent lubrication will be unnecessary.

These pawl carrying levers are pivoted on a shaft 8 which is arranged transversely of the car body 9 beneath the same, being mounted in hangers 10, and each pawl carrying lever carries a pawl 11 which is normally pressed into engagement with respective ratchet wheels 12 on the shaft by means of a spring 13.

These ratchet wheels 12 are at the ends of a brake drum or disk 14 and they are rigid with the drum or disk so that when the ratchet wheels rotate the disk will also rotate. When the car is running a practically continuous movement or rotation will be imparted to the drum.

A brake band encircles the disk, the said band consisting of sections 15 and 15ª, which at one end have hooks for engaging a clip 16. This clip has hooks at its ends which engage within the hooks of the sections, and set screws 17 are provided for securing the clip in place on the hooks. Each section carries a series of brake shoes 18. These shoes are curved longitudinally, as shown, to correspond with the curve of the brake disk, and each has a perforated lug 19 on its convex face which extends through an opening in the adjacent section and may be keyed thereto by a key passing through the perforated lug. If found desirable a brake band lining slightly heavier than those used on automobiles may be employed in lieu of the brake shoes 18.

The shoes or linings engage the disk, and when the sections are tightened on the disk, a braking action is exerted on the disk against the action of the links 5 and eccentrics 3, which tends to exert a partial braking action on the axle, but the main braking force is applied through the pull rod 49 to the brake levers of the car in the usual manner as indicated in Fig. 3, the brake levers, rods, beams etc. remaining the same as with the Westinghouse or other air brakes, except that where the eccentrics are, the brake rod is attached directly to the brake beam, as an equalizing lever is not needed. The other end of the section 15 is received between the lower ends of a pair of links 20 and is pivoted thereto by a bolt 21 which bolt also pivotally connects the pull rod 49. The opposite upper ends of the links 20 engage opposite sides of a piston rod 22, and are pivotally connected thereto by a bolt 23. This rod is connected with a piston in a braking cylinder 24. The other end of the section 15ª of the brake ring is also received between the links 20 between the bolts 21 and 23 and is pivoted thereto, as indicated at 25, the arrangement being such that when the upper ends of the links 20 are moved away from the cylinder, the sections of the ring will be loosened, while when the said upper ends are moved toward the cylinder the sections will be tightened on the disk. When the ring is tightened the ring, links, etc. revolve with the disk until the pull rod 49 has traveled far enough to cause the brake shoes of the car to be brought up firmly against the car wheels when an emergency application is made, or a shorter distance for a service application. The ring will then slip on the disk, but holding the brakes in the same set position until another change is made in the train line pressure, or with the hand brake.

Coil springs 26 are arranged between the upper ends of the links and a shaft 27 journaled in a hanger beyond the end of the cylinder remote from the links and this shaft has a worm gear 28 engaged by gear 28' on shaft 29 which shaft is set in a horizontal position, one end being made square for receiving a reversible ratchet lever or a wrench and the other end fitted with a pair of bevel gears 142 so that wheel 143 may be located above the floor of the car platform on passenger cars, and at a convenient place beside the hand brake on freight cars, as indicated in the drawings. A reversible ratchet lever or a detachable wrench may be used instead of wheel 143 if desired. This furnishes a positive means of rotating shaft 27 in either direction either from the ground or on the car.

Chains are connected with the ends of the springs and wind upon the shaft, and the tension of the springs may be regulated by the shaft. The train line is connected to the cylinder 24 by a pipe 30. When the train line pressure is admitted to the cylinder 24, the piston therein is moved outward, that is, toward the axle, and the brake is loosened. As soon, however, as the pressure is reduced in the train line, the piston moves inward, that is, away from the axle, and the brake is tightened or set. The amount of the reduction will regulate the pressure of the brakes.

The usual brake shaft 31 is journaled at each end of the car, and this shaft has the usual wheel 32 for operating the same. A chain 33 winds upon each shaft, each chain 33 being connected by a link 35 with an equalizing lever 36. A link and chain 37 connects the one end of this lever 36 with the piston rod 22. The other end of the lever 36 is connected, as indicated at 38, with the corresponding lever 36 of the brake mechanism at the other end of the car. It will be obvious that the brake may be released by turning the wheel 32 in the proper direction to throw the upper ends of the links 20 toward the shaft 31, and the brakes may be held released by means of a pawl 44 which engages a ratchet wheel 40 on the shaft, the said pawl being pivoted at 45, and the end of the pawl remote from the ratchet wheel is engaged by a flexible diaphragm 46 in a casing 47 which is connected by a pipe 48 with the train line so that the pressure on the train line is transmitted to the diaphragm.

Whenever pressure is admitted to the train line the pawl 44 is thrown out of engagement with the ratchet wheel releasing the same. A pull rod 49 is connected with the lower end of the links 20 at the bolt 21, and the weight of the links and the adjacent end of the pull rod is taken off the brake disk, by springs 50 which are arranged between the pull rods and the bottom of the car.

The pull rod is provided with a turn buckle 51, in order that the proper adjustment for the brakes may be obtained. It will be noticed, referring to Figure 1, that the cylinder 24 has the end adjacent to the links 20 reduced and detachably connected therewith. As shown in Fig. 6, a gasket 52 is arranged at this point, against which the piston is forced when the train line pressure is in the cylinder to make a tight seal to prevent leakage at this point.

In operation, when the car wheels and axle are turning in either direction, the eccentrics impart a recipirocating motion to the links 5, vibrating the pawl carrying arms and imparting a rotary movement to the ratchet wheels and to the disk. This movement is continuous when the car is running, and it will be evident that any pressure of the band 15—15$^a$ will resist such movement, exerting a braking action on the axle in connection with the braking force applied to the car wheels through pull rod 49. When the valves are open to permit air to enter the cylinder 24 from the train line the piston is forced out, swinging the upper ends of the levers 20 and holding the brake mechanism in release position.

When the pressure is reduced in the train line, the piston is moved inward and the brake ring is tightened on the disk, causing the brake ring to revolve with the disk a certain distance, carrying the pull rod, etc. with it thus applying the brakes. The disk also resists the movement of the eccentrics thus assisting in braking the movement of the car. The disk now resists the movement of the eccentrics, braking the movement of the car. With a service application the reduction is from five to twenty pounds, and it may be made as gradually or as quickly as may be desired, and the pressure may be increased and the brakes released in the same manner. An emergency application is made by still further reducing the pressure to about thirty pounds below the train line pressure. This brings the piston up close against the head at the rear end of cylinder and any further reduction down to zero does not materially affect the brakes if they have been properly adjusted. Should the wheels slide in the emergency application the pull rod 49 should be slightly lengthened and shortened if it does not set tightly enough.

When the application is made, the springs 26 pull on the upper ends of the links 20 in proportion to the amount of reduction made in the pressure. As the links are drawn toward the brake cylinder the brake band is tightened around the brake disk, which causes the band to rotate with the disk, pulling the pull rod with it until the resistance offered by the pull rod is equal to the friction between the brake shoes and the disk in addition to the pull of the springs 26. When this point is reached it remains the same until an increase or further reduction of pressure is made in the train line. Thus a uniform application of the brakes can be maintained for an indefinite time without it being necessary to make frequent releases in order to recharge auxiliary reservoirs. The cylinder 24 acts thus as an auxiliary reservoir. When a release is made, the links 20 are pushed by the piston or pulled by the hand brake to loosen the brake band, and force the pull rod back, making a complete release of the brakes.

Should it be desired to handle a few cars from the train, this can be done without difficulty by closing the angle valves before uncoupling the hose, to retain the air pressure. The brakes can then be controlled with the angle valve or the conductor's valve if on a down grade, but on a level the brakes can be left to set up at leisure. Should the engineer's valve fail to work the brakes can be applied by simply opening any valve in the train line to reduce the pressure. The brakeman can then give his whole attention to flagging other trains, instead of being required to set hand brakes in case the train were on a grade. Because of the action of the spring 26 the brakes are automatically set when the air escapes and will remain set for an indefinite length of time; in fact, until the air is again applied or until the brakes are manually released. This makes it possible for one locomotive to handle a long train with safety on a down grade.

The tension of the springs 26 is made to conform with different standard train line pressures, as required on different railroads, by means of the shaft 27. If desired, a compression spring may be fitted within the cylinder to partially relieve the strain on the spring 26. Said springs should be as long as possible in order to make the pull uniform throughout the stroke. The size of the cylinder and the arrangement of the spring should be such that with the assistance of the operating mechanism the brakes can be moved from full release to full emergency application with the reduction of about thirty pounds pressure. This will permit cars equipped with this type of brake to be used in the same train with cars equipped with Westinghouse brakes When only one braking mechanism is used on each car it will be obvious that the link 35 will be connected directly with the link 37.

When releasing the brakes with a hand brake the shaft is turned clockwise until the brakes are sufficiently released to permit free movement of the car. The brakes may be again applied by permitting the shaft to turn oppositely of its own accord, but not too quickly unless an emergency application is desired.

When the car is standing on the level and is to be moved frequently the brakes may be held in release position by engaging the pawl 44 with the ratchet wheel. When the car is again coupled and air is admitted from the train line the pawl will be released through the expansion of the diaphragm. The air will thus have full control of the brakes, eliminating the necessity for the brakeman to mount the car to release the hand brakes when making up a train.

I claim:

1. In combination with a railway car, of braking mechanism comprising a brake disk, a brake band cooperating therewith, levers connected at one end to the band for tightening the same when the levers are swung in one direction and for loosening the band when they are swung in the opposite direction, pawl and ratchet mechanism for turning the disk in one direction and connected with an axle of the car to be operated by the turning of the axle in either direction, a cylinder having a piston connected with the levers to release the band when the piston is moved outward and to tighten the band when the piston is moved inward, springs for drawing the piston inward and connected with the levers, and means for regulating the tension of the springs.

2. In combination with a railway car, of braking mechanism comprising a brake disk, a brake band co-operating therewith, levers connected at one end to the band for tightening the same when the levers are swung in one direction and for loosening the band when they are swung in the opposite direction, pawl and ratchet mechanism for turning the disk in one direction and connected with an axle of the car to be operated by the turning of the axle in either direction, a cylinder having a piston connected with the levers to release the band when the piston is moved outward and to tighten the band when the piston is moved inward, a hand brake connected with the levers for controlling the tightening of the band, and means for holding the hand brake with the brakes in release position and controlled to disengage by the pressure in the cylinder.

3. In combination with a railway car, of braking mechanism comprising a brake disk, a brake band cooperating therewith, levers connected at one end to the band for tightening the same when the levers are swung in one direction and for loosening the band when they are swung in the opposite direction, pawl and ratchet mechanism for turning the disk in one direction and connected with an axle of the car to be operated by the turning of the axle in either direction, a cylinder having a piston connected with the levers to release the band when the piston is moved outward and to tighten the band when the piston is moved inward, manually controlled means connected with the levers for releasing the band, and means for holding said manually controlled means with the brakes in release position and releasable by a predetermined strain upon the said manually controlled means.

4. In combination with a railway car, of braking mechanism comprising a brake disk, a brake band cooperating therewith, levers connected at one end to the band for tightening the same when the levers are swung in one direction and for loosening the band when they are swung in the opposite direction, pawl and ratchet mechanism for turning the disk in one direction and connected with an axle of the car to be operated by the turning of the axle in either direction, a cylinder having a piston connected with the levers to release the band when the piston is moved outward and to tighten the band when the piston is moved inward.

5. In a car brake, the combination with a braking member, of a pressure actuated member having connection with said braking member, a spring having connection with said braking member and with said pressure actuated member, manually controlled means for varying the tension of said spring, a brake drum arranged within the braking member, and means designed to rotate the brake drum from an axle of the car.

6. In combination with a railway car having a train line, braking mechanism comprising a brake disc, means for mounting the brake drum for rotary movement, a brake band co-operable with said brake drum, levers connected to the band for tightening the same when the levers are swung in one direction and for loosening the same when the levers are swung in an opposite direction, motion transmission means between the brake drum and an axle of the car whereby the axle and the brake drum are constrained to partake of corresponding movement, a cylinder having connection with the train line, a piston in said cylinder, said piston having a piston rod connected with said levers and operable to move the levers to such position as to release the brake band when the piston is moved to one end of the cylinder, means co-operable with the piston rod levers for urging the piston and the levers to such position as to set the brake, whereby upon reduction of pressure in the train line the brake is set.

7. In a car brake the combination with a braking member, of a pressure actuated member having connection with said braking member, a spring having connection with said braking mechanism and urging the braking member to one position, manually controlled means for varying the tension exerted by said spring, a brake drum arranged within said breaking member and having ratchet wheels, pawls engaged with said ratchet wheels, pawl actuating members associated with said pawls and having eccentric surrounding straps, and eccentrics arranged within said straps.

8. In a car brake the combination with a drum having a ratchet wheel, a pawl engaging said ratchet wheel, means to actuate said pawl to rotate said drum, a brake band surrounding said drum, and a fluid pressure controlled member for operating said brake band.

9. In a car brake the combination with a drum having a ratchet wheel, a pawl engaging said ratchet wheel, means to actuate said pawl to rotate said drum, a brake band surrounding said drum, a fluid pressure controlled member for operating said brake band, and a spring having connections with said brake band for urging the same to one position.

10. In combination with a railway car having a train line, braking mechanism comprising a brake disc, means for mounting the brake drum for rotary movement, a brake band co-operable with said brake drum, levers connected to the band for tightening the same when the levers are swung in one direction and for loosening the same when the levers are swung in an opposite direction, motion transmission means between the brake drum and an axle of the car whereby the axle and the brake drum are constrained to partake of corresponding movement, a cylinder having connection with the train line, a piston in said cylinder, said piston having a piston rod connected with said levers and operable to move the levers to such position as to release the brake band when the piston is moved to one end of the cylinder, means co-operable with the piston rod levers for urging the piston and the levers to such position as to set the brake, whereby upon reduction of pressure in the train line the brake is set, hand brake mechanism connected with the levers for manually releasing the brakes.

11. In combination with a railway car having a train line, of means for braking the said car and actuated by the movement of the car in either direction, fluid pressure controlled means for restraining the action of the said braking means and adapted for connection with the train line and releasable by a reduction of pressure in the train line, manually controlled means for controlling the braking mechanism, means for holding said manually controlled means with the brakes in released position, and means controlled by the pressure in the train line for releasing the said holding means.

PETER L. PETERSON.